United States Patent [19]

Tai et al.

[11] Patent Number: 5,608,837
[45] Date of Patent: Mar. 4, 1997

[54] TRANSMISSIVE TYPE DISPLAY AND METHOD CAPABLE OF UTILIZING AMBIENT LIGHT

[75] Inventors: Ping-Kaung Tai; Chen-Yu Tai, both of Toledo, Ohio

[73] Assignee: Clio Technologies, Inc., Holland, Ohio

[21] Appl. No.: 441,092

[22] Filed: May 15, 1995

[51] Int. Cl.$^6$ ............ G02B 6/10; G02F 1/1335
[52] U.S. Cl. ............ 385/146; 385/36; 385/901; 362/31; 362/32; 349/62
[58] Field of Search ............ 385/36, 129, 130, 385/131, 132, 901, 146, 37; 359/36, 40, 42, 48, 49; 362/31, 32

[56] References Cited

U.S. PATENT DOCUMENTS

| | | | |
|---|---|---|---|
| 4,257,084 | 3/1981 | Reynolds | 362/31 |
| 4,323,951 | 4/1982 | Pasco | 362/27 |
| 4,528,617 | 7/1985 | Blackington | 362/32 |
| 4,706,173 | 11/1987 | Hamada et al. | 362/341 |
| 4,799,137 | 1/1989 | Aho | 362/309 |
| 4,805,984 | 2/1989 | Cobb, Jr. | 385/147 X |
| 4,883,333 | 11/1989 | Yanez | 385/147 X |
| 4,917,465 | 4/1990 | Conner et al. | 359/49 X |
| 5,040,878 | 8/1991 | Eichenlaub | 359/49 X |
| 5,050,946 | 9/1991 | Hathaway et al. | 385/33 |
| 5,106,181 | 4/1992 | Rockwell, III | 385/2 |
| 5,339,179 | 8/1994 | Rudisill et al. | 359/49 |
| 5,359,691 | 10/1994 | Tai et al. | 385/146 |
| 5,371,618 | 12/1994 | Tai et al. | 359/53 |
| 5,390,276 | 2/1995 | Tai et al. | 385/146 |
| 5,396,350 | 3/1995 | Beeson et al. | 359/40 |
| 5,479,275 | 12/1995 | Abileah | 359/48 |
| 5,485,291 | 1/1996 | Qiao et al. | 359/49 |
| 5,506,929 | 4/1996 | Tai et al. | 385/146 |

FOREIGN PATENT DOCUMENTS

| | | | |
|---|---|---|---|
| 3825436A1 | 3/1989 | Germany | 385/901 X |
| 62-73206 | 4/1987 | Japan | 385/901 X |
| 63-287803 | 11/1988 | Japan | 385/901 X |
| 63-271301 | 11/1988 | Japan | 385/901 X |

*Primary Examiner*—Brian Healy
*Attorney, Agent, or Firm*—Paula N. Chavez

[57] ABSTRACT

Disclosed is a transmissive type display which uses ambient light for enhanced backlighting and which can be used with or without an artificial light source which is either built-in or external to the unit. The backlighting display assembly includes a light pipe with an arrangement of immediately adjacent microprisms serving as the back surface of the light pipe and a light injecting system. The backlighting system may also include a compensating plate or film which also has an immediately adjacent surface profile complementing that of the light pipe. The compensating plate, placed on top of the light pipe, is used to provide uniform illumination. Since outdoor ambient light provided by the sun usually comes from overhead, a light bending film may also be included in the backlighting system so that the display utilizes the overhead light effectively.

46 Claims, 9 Drawing Sheets

FIG. 8A
NO OPTICAL COMPENSATOR

FIG. 8B
WITH OPTICAL COMPENSATOR

TRANSMISSIVE TYPE DISPLAY AND METHOD CAPABLE OF UTILIZING AMBIENT LIGHT

FIELD OF THE INVENTION

This invention relates to flat panel displays and more particularly to transparent flat panel displays capable of utilizing ambient light and internal light sources for providing light output.

BACKGROUND OF THE INVENTION

Non-emissive flat panel displays, including liquid crystal displays, are commonly used in portable computer systems, televisions and other electronic display devices. Non-emissive flat panel displays can be divided into two types—reflective and transmissive.

Reflective type displays use ambient light for energy efficiency. However, lacking a suitable built-in lighting system and suffering from a low brightness, the reflective type displays are used mainly for low end monochromatic applications. Back-lit transmissive type displays, on the other hand, are used mainly in high end products such as notebook computers and televisions because they beneficially have a very high contrast ratio and low surface reflectivity.

One disadvantage to the backlighting system of a transmissive display is that it consumes a significant amount of power and its brightness is limited by available lighting power. Most of the transmissive type displays are not suitable for outdoor applications because they lack sufficient brightness.

Transmissive type displays completely rely on their build-in lamps for illumination. As a result, the battery life of the portable computers are quite short (usually, less than 4 hours). Furthermore, most of the existing transmissive type displays do not have a sufficient brightness for outdoor applications. Moreover, since transmissive type displays using backlighting systems of the prior art are not transparent, ambient light cannot be used to enhance their illumination. There is a need to obtain a sufficiently bright transmissive type display which uses as little power consumption as possible while also generating a sufficient brightness for outdoor use.

Overhead projection palettes which are used in conjunction with overhead projectors, are used to transfer data on a computer screen to a projection screen. These are transmissive type displays which rely solely on ambient light for their illumination, specifically, an overhead projector having capable of high lumen output.

SUMMARY OF THE INVENTION

This invention is a transparent transmissive type display which uses ambient light for enhanced backlighting. Accordingly, it can be used, for example, in outdoor applications, with or without using its artificial light source which is either built-in or external to the unit. Beneficially, this invention can be used in all types of weather.

More specifically, the backlighting display assembly includes a light pipe with an arrangement of immediately adjacent microprisms serving as the back surface of the light pipe and a light injecting system. The backlighting system may also include a compensating plate or film which also has an immediately adjacent surface profile complementing that of the light pipe. The compensating plate, placed on top of the light pipe, is used to provide uniform illumination. Since outdoor ambient light provided by the sun usually comes from overhead, a light bending film may also be included in the backlighting system so that the display utilizes the overhead light effectively.

A light pipe for the transparent lighting system has been described in U.S. Patent Application Ser. No. 08/255,378, filed Jun. 8, 1994, pending, and entitled "A Flat and Transparent Front-Lighting System Using Microprisms," such being incorporated by reference. However, since in the present invention image distortion is not a concern, design of the lighting system may be modified for better energy efficiency, such being discussed below. Moreover, also incorporated by reference is U.S. Patent Application Ser. No. 08/332,262, filed Oct. 19,1994, now U.S. Pat. No. 5,506,929, and entitled "A Light Expanding System for Producing a Linear or Planar Light Beam from a Point-Like Source," as are the following U.S. Patents: U.S. Pat. No. 5,359,691 issued Oct. 25, 1994 entitled "Backlighting System with a Multi-Reflection Light Injection System Using Microprisms;" U.S. Pat. No. 5,371,618, issued Dec. 6, 1994, entitled "Color Liquid Crystal Display Employing Dual Cells Driven with an Exclusive OR Relationship;" and U.S. Pat. No. 5,390,276, issued Feb. 14, 1995, entitled "Backlighting Assembly Utilizing Microprisms and Especially Suitable for Use with a Liquid Crystal Display."

In one embodiment of the flat front lighting assembly, a linear light source is coupled to the light pipe by means of a light collimating assembly extending parallel to the linear light source. This light collimating assembly, which is a desirable but not essential element in this invention, can collimate light, to a certain degree, in the plane perpendicular to the surface of the light pipe by reflection inside the collimating assembly. The light is coupled out of the backlighting system by means of specular reflection from microprisms. Ambient light from the upper direction, such as the sky, is bent by a film with non-symmetric microprisms to propagate towards the viewer.

BRIEF DESCRIPTION OF THE DRAWINGS

The present invention will be described in more detail below in conjunction with the drawings, wherein.

DETAILED DESCRIPTION OF THE INVENTION

We turn now to the drawings, where like components are referenced by like reference numerals throughout the various figures. Attention is first directed to FIG. 1 which shows a notebook computer 2 using a transparent lighting system having a substantially transparent back panel 5 through which ambient light 24 passes. The ambient light is generated by an ambient light source 7 such as the sun if used outdoors or if the notebook computer 2 were used indoors, the indoor lighting system. Because it is capable of utilizing whatever ambient light is available, the transparent lighting system of this invention is useful outdoors in all types of weather.

Figure 1:
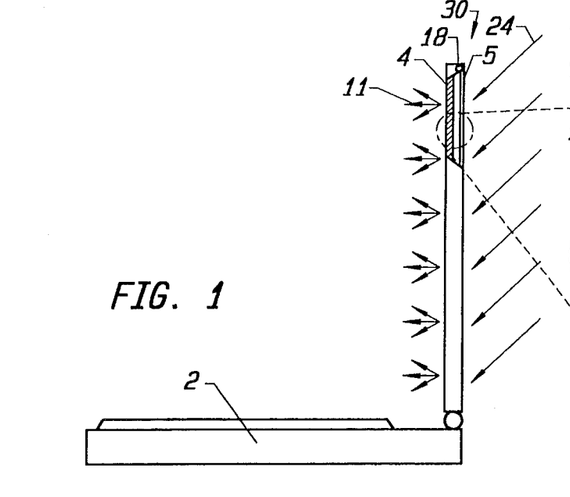
FIG. 1 is a perspective view of a portable type computer using a transparent lighting system so that ambient light from the upper direction can be used for enhanced backlighting.

The display module 4 of notebook computer 2 is composed of a liquid crystal display (LCD) front panel 6, a transparent lighting light pipe 8, a diffuser 10, an optical compensator 12, and a light collection film 14 at the back panel 5 and transmits light output 11 to the viewer of the display. While, as discussed above, ambient light is collected by light collection film 14, light rays 16 from a built-in light source 18 (see FIG. 2) are reflected out of the light pipe by a side surface 20 of microprisms 22 on the back surface of the light pipe to illuminate the display. Thus, the ambient light source 7 and the built-in light source together provide light to display 4. While light pipe 8 is configured to transmit light to the display 4, it is possible for light to be directed in a manner different from that which is described below. The following is intended to provide a disclosure for the principles claimed below in a manner which takes into account deviations from the embodiments described below.

Ambient light 24 coming from the upper direction is bent by the light collection film 14 changing its direction to the direction normal to the LCD panel. The output from the light collecting film 14 of back panel 5 will pass through the optical compensator 12, the light pipe 8, and the diffuser to illuminate the display. A beam expanding film 26 which modifies the angular distribution profile of the light output from the light pipe to match the desired viewing angle of the display is placed between the light pipe 8 and the LCD panel 6. The diffuser 10 is used to mask images of objects behind the back panel 5 so that the viewer viewing the front panel 4 can focus his attention on the display image on front panel.

Figure 2:
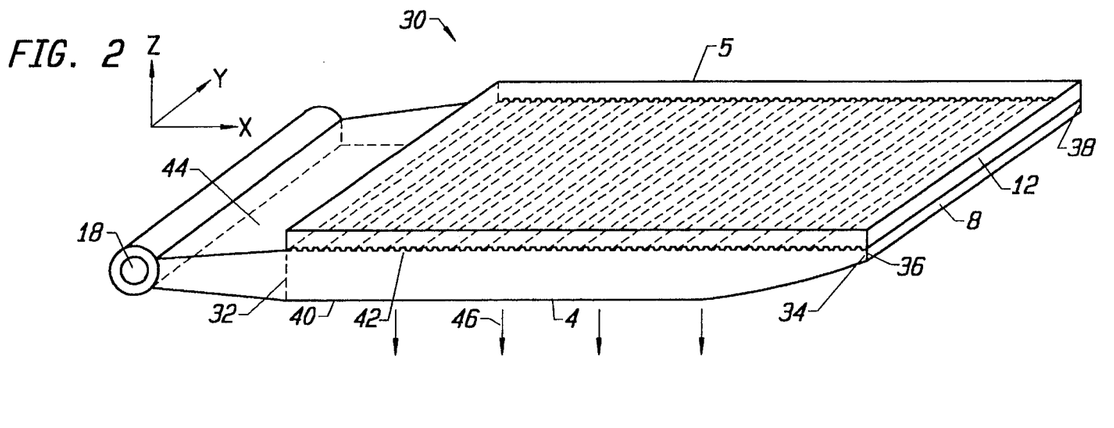
FIG. 2 is a perspective view of a transparent lighting assembly which is designed in accordance with the present invention where the transparent lighting assembly is shown with respect to an x, y, z coordinate system for the purpose of convenience.

An example of a transparent transmissive lighting system including a light source such as a miniature fluorescent lamp 18 is shown in FIG. 2. As discussed above, this figure illustrates in a perspective view of an assembly 30 designed in accordance with the present invention for back-lighting a transmissive type display 6 positioned substantially adjacent the front panel 4. The assembly is in an x-y-z coordinate system where ambient light 24 transmits through this transparent assembly in the z-direction.

Assembly 30 includes a front-lighting light pipe 8 which extends laterally in both x-direction and y-direction, between opposite ends 32 and 34 and opposing ends 36 and 38, and has opposing top and bottom surfaces 40 and 42 respectively, extending horizontally (in the x-y plane). The front-lighting light pipe serves the purpose of directing light in the z-direction through the apparatus and will be discussed in more detail below.

The light source 18 light-directing arrangement 44 is provided for directing light of the light source 18 into the light pipe 8 at its entry end 32. In this particular example, the light pipe 8 has a reduced thickness near the end 34 to minimize light leakage.

Still referring to FIG. 2, the light pipe 8 is shown to include micro-prisms, delineated by a ripple surface, extending in the x-y plane on its top surface 40. In the particular embodiment illustrated in FIG. 2, each of the microprisms has a light directing shape, such as a trapezoid cross section. The size of the microprisms and the height of the light pipe sections have been exaggerated in order to more fully understand the way in which they act upon light introduced into the light pipe. The top surface of the microprisms is parallel to the x-y plane. This arrangement of microprisms may be constructed of any suitable transparent material such as glass, acrylic or polycarbonate having the same or approximately the same index of refraction as the light pipe 14.

Figure 1A:
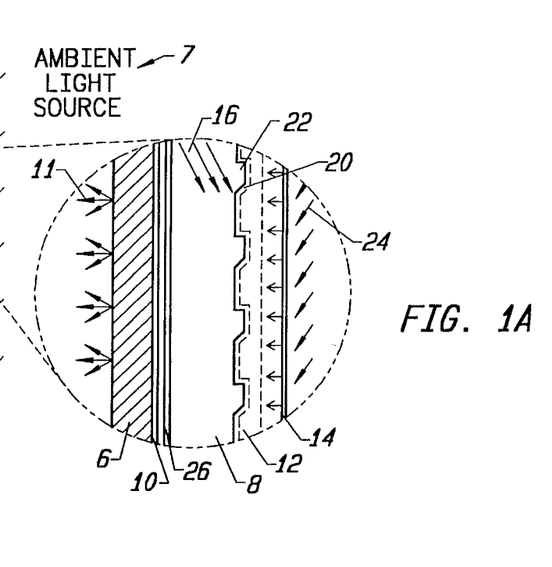
FIG. 1A is an expanded cross-sectional view of transparent lighting system shown in FIG. 1.

As light is introduced into the light pipe at its entry end 32, for example, by means of arrangement 44, light is reflected downwards through bottom surface 42 in the direction of a display panel 6 (see FIG. 1A), as indicated by arrows 46. As will also be seen, this arrangement of microprisms and arrangement 44, can be designed to cooperate with one another so as to ensure that all of the light 46, coming from the lamp and hitting the surface of a microprism, will be reflected by total internal reflection downward, and no light from the lamp will transmit through the microprism surface and propagate upward. With this approach, a very high energy efficiency is achieved in backlighting the display panel 6 with the built-in lamp 18.

Figure 3:
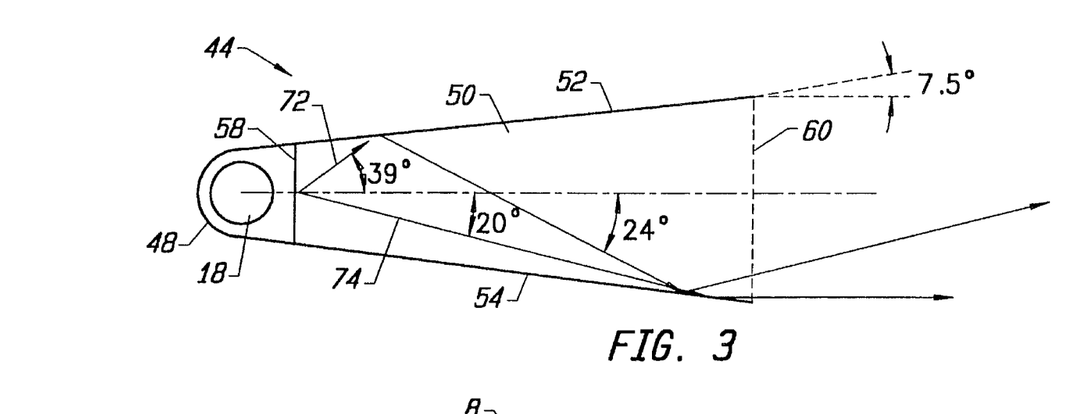
FIG. 3 is a sectional view of a light directing assembly taken in x-z plane.

Turning now to FIG. 3, a section view of the arrangement of 44, the light source 18 and its associated fixture 48 is shown in the x-z plane. The arrangement 44 includes a reflection prism 50 extending parallel to the entry side of the light pipe 8 (see FIG. 2). The prism 50 has opposing top and bottom surfaces 52 and 54, and opposite ends 58 and 60. Light entering the prism in the x-z plane has a maximum divergence angle determined by the index of refraction of the material that the prism is made of (39° if this prism is made of polycarbonate which has an index of refraction of 1.59). Here it should be noticed that conventional methods for collimating, such as the use of a reflecting parabolic mirror cannot achieve the required collimation due to the relative big size of the light source in comparison with the thickness of the light pipe.

To collimate light into a desired divergence range, for example, ±9° the top and bottom surfaces 52 and 54 are constructed at a tilt angle, for example about 7.5° with respect to the x-axis, as illustrated in FIG. 3. As an example, light ray 72, which enters the reflection prism at a divergence angle of 39° with respect to the x-axis, will be reflected by the top surface 52 and then the bottom surface 54 of the reflection prism. With each reflection, the light ray will have its divergence angle decreased by 15° for a 7.5° tilted surface. As a result, the light ray 82 leaving the collimating section will have a divergence angle of 9°, which is within the desired maximum divergence angle of ±9°. However, light rays, such as ray 74, which has a smaller initial divergence angle, for example 20°, will be reflected by the surface of the collimating light pipe only once within the entire light collimating assembly and will have its divergence angle decreased by 15°. In addition, light with divergence angle less than 7.5° will not hit the surface and propagate through the collimating assembly with direction unchanged. With a properly constructed collimating assembly, light rays with any incident angle will be collimated to have a divergence angle less than ±9°.

The divergence angle may be further reduced by additional reflections at the tilted surfaces which may have its slope varied along the x-direction. Since all changes in propagation direction are a result of total internal reflection, there is no loss in their intensities. Although it is possible to use a conventional reflection surface, such as a plated mirror, to collimate the light, it is far more efficient to collimate light by using a reflective surface based on total internal reflection. It is also understood here that the sides of the light collimation section may have a curved surface area or even consist of segments of flat and curved surfaces for effective light collimation. Although multiple reflection is needed for highly collimated light output, single reflection may be adequate for some applications. For applications that do not require collimated output, the light collimation section may even be totally omitted.

An important purpose of collimating light is to ensure that, with total internal reflection, no light will exit the light pipe and propagate in the direction away from the display panel so that the backlighting system has a very high energy efficiency.

Having described the way in which light from source 18 is directed by means of the light directing assembly 44, attention is now directed to the way in which the transparent-lighting light pipe 8 in cooperation with microprisms 22 acts on the input light to provide output front-lighting 11 (see FIG. 1). To this end, reference is directed to FIG. 4 which provides a cross sectional view of light pipe 8 in the x-z plane. For the purpose of this discussion, it will be assumed that the maximum divergence angle at which light enters the backlighting light pipe is ±9°, as depicted in FIG. 3. Of course, any divergence angles and any manner of achieving them which are consistent with the stated purpose of the present invention may be used.

Figure 4:
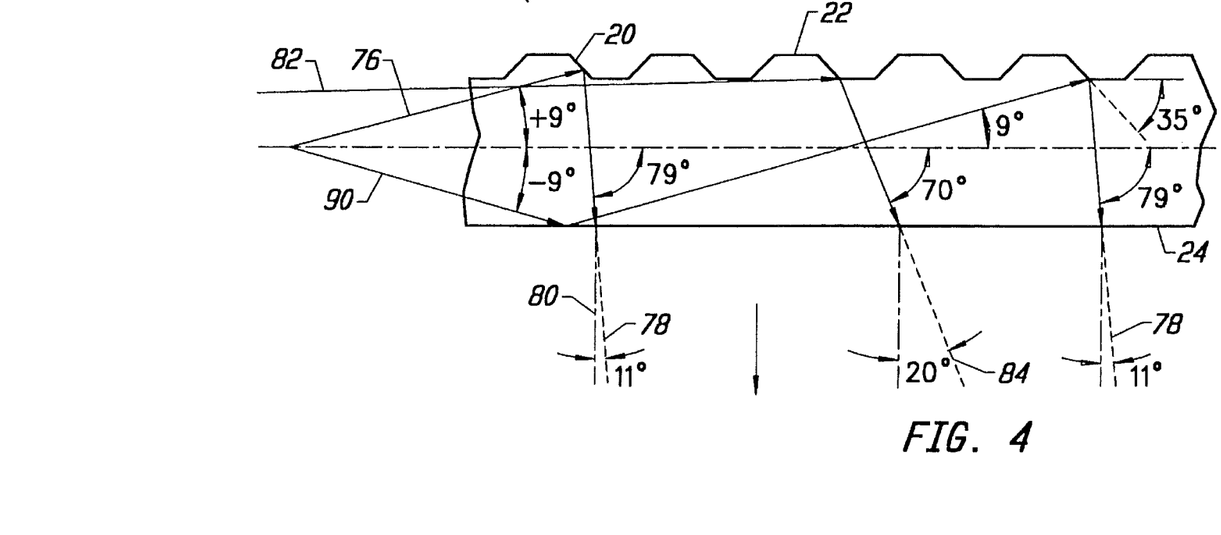
FIG. 4 is a sectional view of a portion of a light pipe forming part of the lighting assembly of FIG. 1, specifically illustrating the way in which light enters and exits the light pipe.

In the particular embodiment illustrated in FIG. 4, each prism 20 has its surface 22 making an angle of 35° with a plane parallel to the top surface of the light pipe. Surface 22 faces the ambient light entrance side of the light pipe. It is to be understood that the present invention is not limited to these particular physical parameters. The material as well as the angle that the surface of the microprism makes with the top surface of the light pipe may all have different values. The reflecting microprisms may even have curved surfaces.

Still referring to FIG. 4, note specifically that the incoming light beam 76, which deviates by +9° from the x-axis, will hit the surface of a prism, will be bent by 70° and then propagate in the direction 78 which deviates by +11° from the normal 80. On the other hand, light beam 82 which propagates nearly parallel to the x-axis will be bent by 70° also and propagates in the direction 84 which deviates by +20° from the normal to surface 24. Also, light beam 90 which initially deviates by −9° from the x-axis will hit the underside of bottom surface 24 and then propagate upwards whereupon it will be reflected by one surface of a microprism in a way similar to light beam 76, thereby propagating in the direction 78 at an angle of +11° with the normal. This process happens to all light beams, making a negative angle with the x-axis.

As a result directing the light beams in this manner, light beams exiting the light pipe through bottom surface 24 in the x-z plane will be collimated to one-half their original divergence angles, that is, one-half that at which light enters the light pipe 8. With the maximum divergence angle of light coming from the light collimating section less or equal to the critical angle of refraction with respect to the surface of the microprisms, no light can escape the light pipe through the light pipe's back side.

In the particular example just described in conjunction with FIG. 4, it was assumed that the microprism 22 makes angles of 35° between its side surface and its base which is parallel to the x-y plane. For the purpose of coupling light out of the light pipe 8, a prism-array having an angle determined by the allowed divergence angle, output light propagation direction, and the index of refraction of the light pipe are within the scope of this invention.

The light pipe in this embodiment has a gradually reduced thickness near the ends to reduce light leakage from the end surface 34 (see FIG. 1). Here it should be noted that light with a relatively large divergent angle will hit the light pipe surface more frequently and will therefore diminish faster than light with a smaller divergent angle. As a result, light propagating to areas near the side 34 has a small divergent angle. If the bottom surface of light pipe in the area close to end 34 makes a small angle, such as 2° with x-y plane, highly collimated light will be bent towards microprisms and coupled out by total internal reflection before reaching the end 34. Thus light leakage is minimized.

Figure 5:
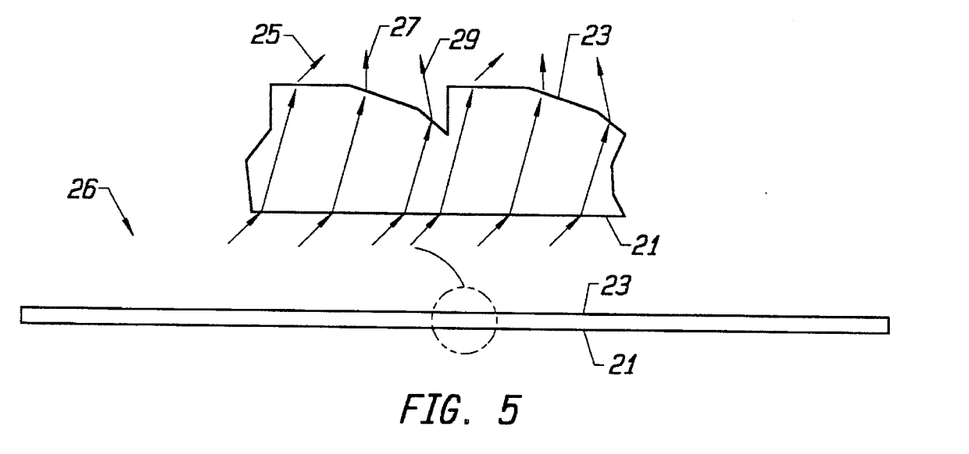
FIG. 5 is a sectional view of a beam bending-expanding film utilized in one embodiment of this invention.

For most types of computer illumination, the propagation direction of light from the above described embodiment is deviated from the normal direction and its divergent angle is can be too restricted to fit the desired viewing angle. A beam bending-expanding film, initially shown in FIG. 1 is shown in detail in FIG. 5, may be used to expand the divergent angle of the output light to match the required viewing angle and also change its propagation direction to a desired direction.

Angle-restricted light enters at the surface 21 and is directed to surface 21 where it becomes splayed in different directions 25, 27 and 29. Thus the output light 11 best shown in FIG. 1 is spread out over a wider viewing angle.

With the application of the transparent lighting system described above, a transmissive flat panel display can use its built-in light source and the ambient light simultaneously for the display illumination. However, in order to use ambient light efficiently, a light collecting film is often required.

For outdoor applications, the sky provides illumination. Accordingly, ambient light usually comes from the upper direction. Although in morning or afternoon, direct sun light comes from a closer to horizontal direction, it is not suitable to backlight a display because it is may cause eye discomfort and can actually be dangerous to a user to use direct sun light to backlight the display. In most offices, a light source is usually installed in the ceiling so that people inside the room are not subject to direct viewing of the lamp. A particular light collection film may be simply a light bending film shown in FIG. 6 to bend ambient light 24 (see FIG. 1) and changing its direction to output direction 43.

Figure 6:
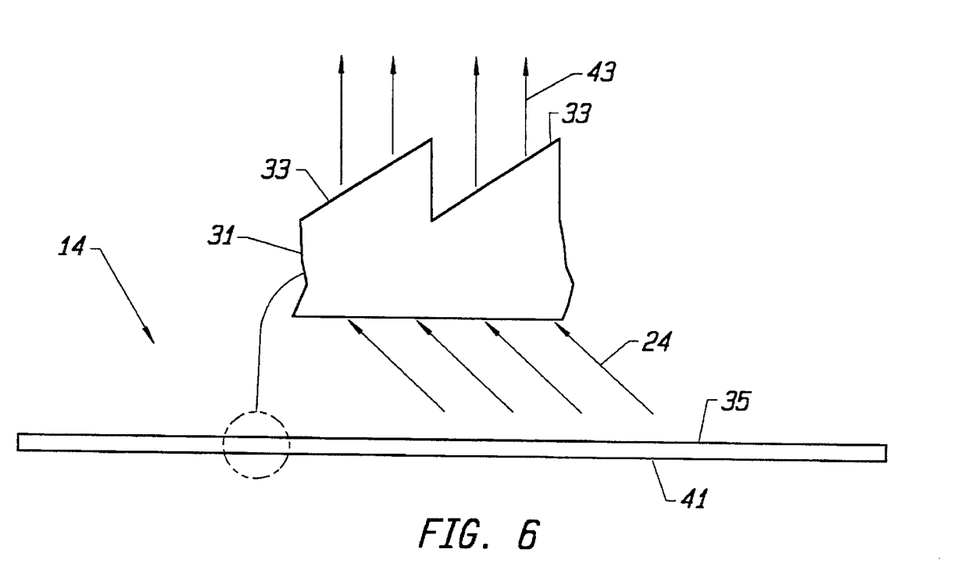
FIG. 6 is a sectional view of a film for light collection.

The film 14 shown in FIG. 6 has rows 31 of adjacent triangular microprisms 33 located on its surface 35. Light 24 coming from the upper direction will be bend by the microprisms 33 in a direction normal to the film. In certain circumstances, the beam bending-expanding film 26 (see FIG. 5) may provide adequate bending power so that the light collection film 14 may be omitted.

Figure 7:
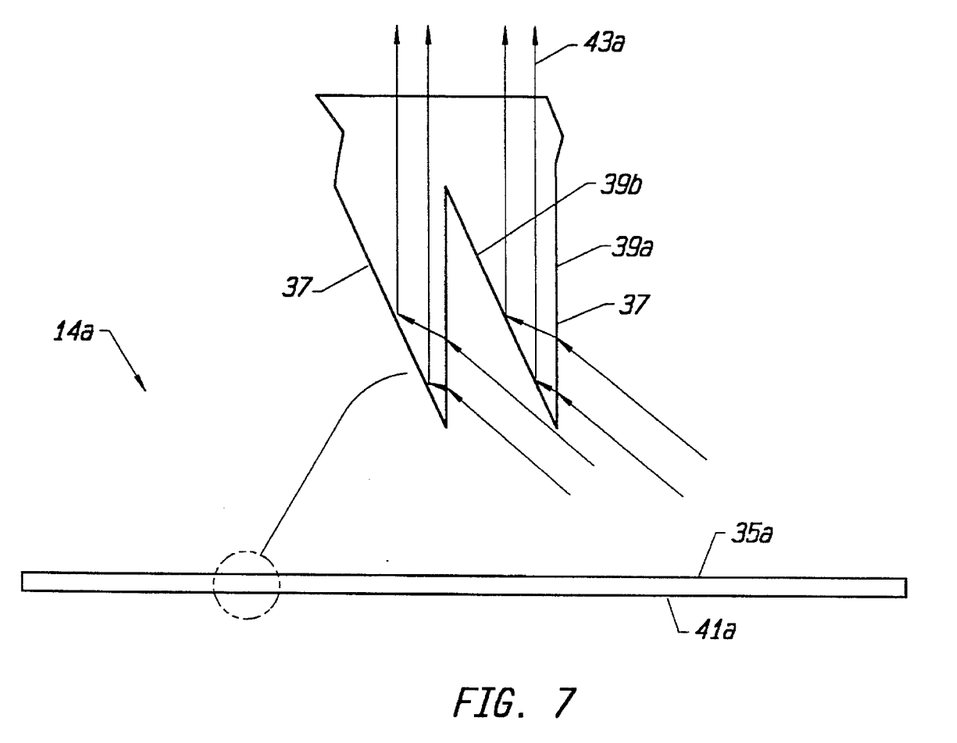
FIG. 7 is a sectional view of the film according to another embodiment of this invention for light collection.

FIG. 7 shows another light collection film 14a. Microprisms 37 in this film have flat surface 39a and 39b. Flat surface 39a is substantially perpendicular to the surface of the film 41a film. Light falling onto the film from the upper direction, for example 50° above horizontal, will enter the film through the flat surface and then hit the surface 39b being reflected by total internal reflection toward the other surface of the film. As a result, light exiting 43a the film will propagate in a direction makes small angle with the horizontal direction.

Figure 8A:
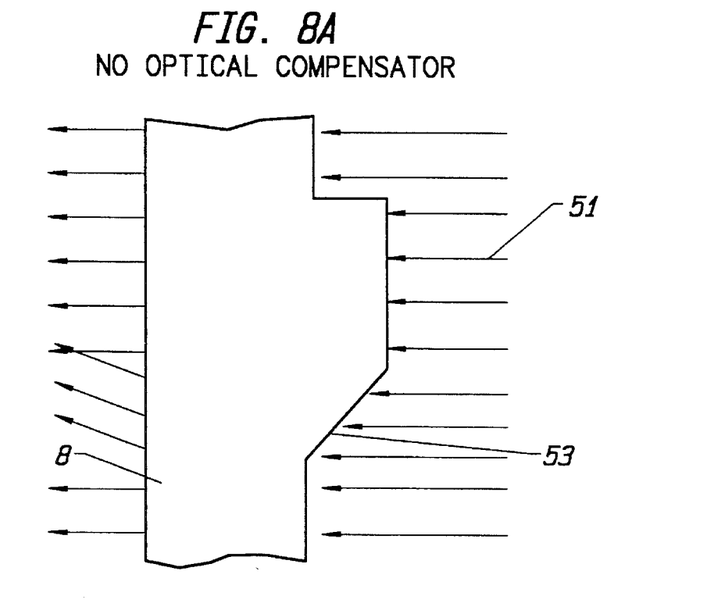
FIG. 8A illustrates deflection of light from its original propagation due to prism structures on the light pipe.

To show a manner in which to reduce the brightness of the backlighting by ambient light we turn to FIG. 8A, which shows schematically parallel, horizontal, light rays 51 propagating towards the light pipe 8 not accompanied by a compensation plate 12. Light rays 51 propagating toward the flat section of the light pipe will go through the light pipe without its propagation direction changed. However, light hitting the inclined surface 53 will deviate significantly from its original propagation direction, resulting in a reduced brightness of backlighting using ambient light.

Figure 8B:
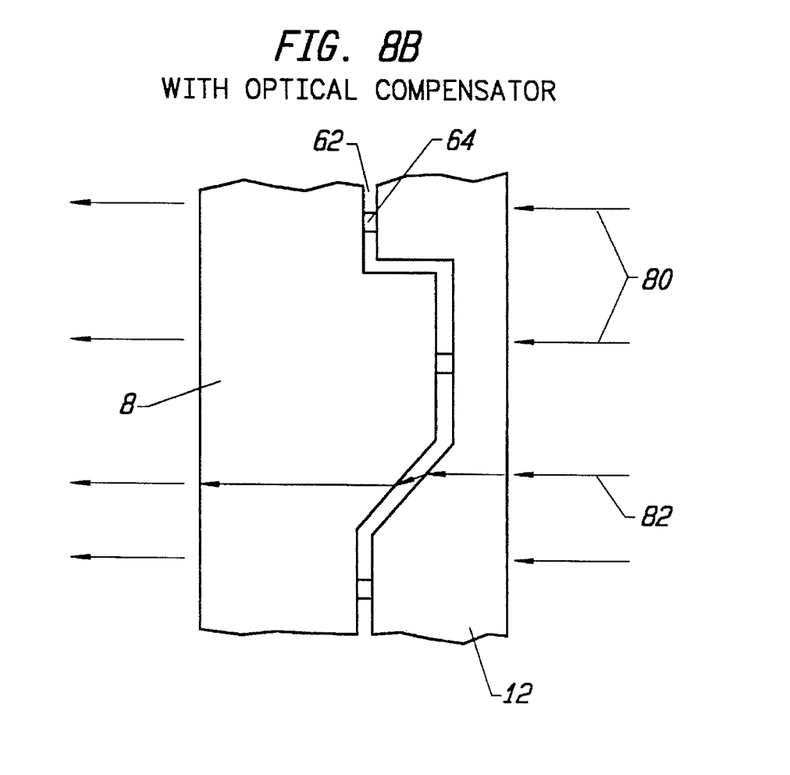
FIG. 8B illustrates an arrangement using an optical compensating plate according to this invention to eliminate light deflection shown in FIG. 8A.

Since the density of the microprisms increases from the side of light pipe 8 near a lamp 18 to the side away from a lamp, efficiency of ambient light for the display illumination will decrease accordingly, resulting a non-uniform backlighting. An optical compensator may be used to reduce or eliminate completely this kind of non-uniformity and improve the efficiency. As shown in FIG. 8B, the compensating plate 12 is usually made of material of the same or similar index of refraction as the light pipe 8 and has a structure on its one surface of a shape that complements the structure on the surface of the light pipe 8. The compensating plate is placed close to the light pipe and is separated from the light pipe by a thin air gap 62 with a thickness maintained by microspacers 64. The microspacers, of a thickness of the order of microns, may be in the form of small plastic or glass disks or balls. The spacer may also be made an integral part of the light pipe or the compensating plate when they are manufactured by molding, compression or other technique. Since an air gap can usually be maintained although with a variable thickness, the spacer is not a required for many applications.

As shown in FIG. 8B, parallel light rays 80 and 82, entering the lighting assembly composed of the light pipe and the optical compensator in a direction normal to the surface of the film. The light ray 80 will hit the flat surface and propagate through the light pipe without changing its direction. Light ray 82 will be bent down when entering the air gap from the optical compensator. However, this light beam will be bent up by the same angle when it enters the transparent light pipe 8. As a result, this light ray will propagate in its original direction inside the light pipe. As a result, both light rays 80 and 82 will keep parallel when they pass through the surfaces between different mediums. The use of a compensating plate can therefore give an improved uniformity and efficiency in using ambient light.

Although it is always desirable to avoid any non-uniformity in order to have high quality display illuminated by the transparent lighting assembly, an unnoticeable amount of non-uniformity is tolerable. A transparent backlighting assembly can have a reasonable good uniformity without using a compensating plate. In this approach, light inside the light pipe is highly collimated so that the microprisms can have a large flat top area enabling most passing through light from ambient sources to keep parallel. The ratio of flat area to tilted area can reach 10:1 satisfying required uniformity of most applications.

Figure 9:
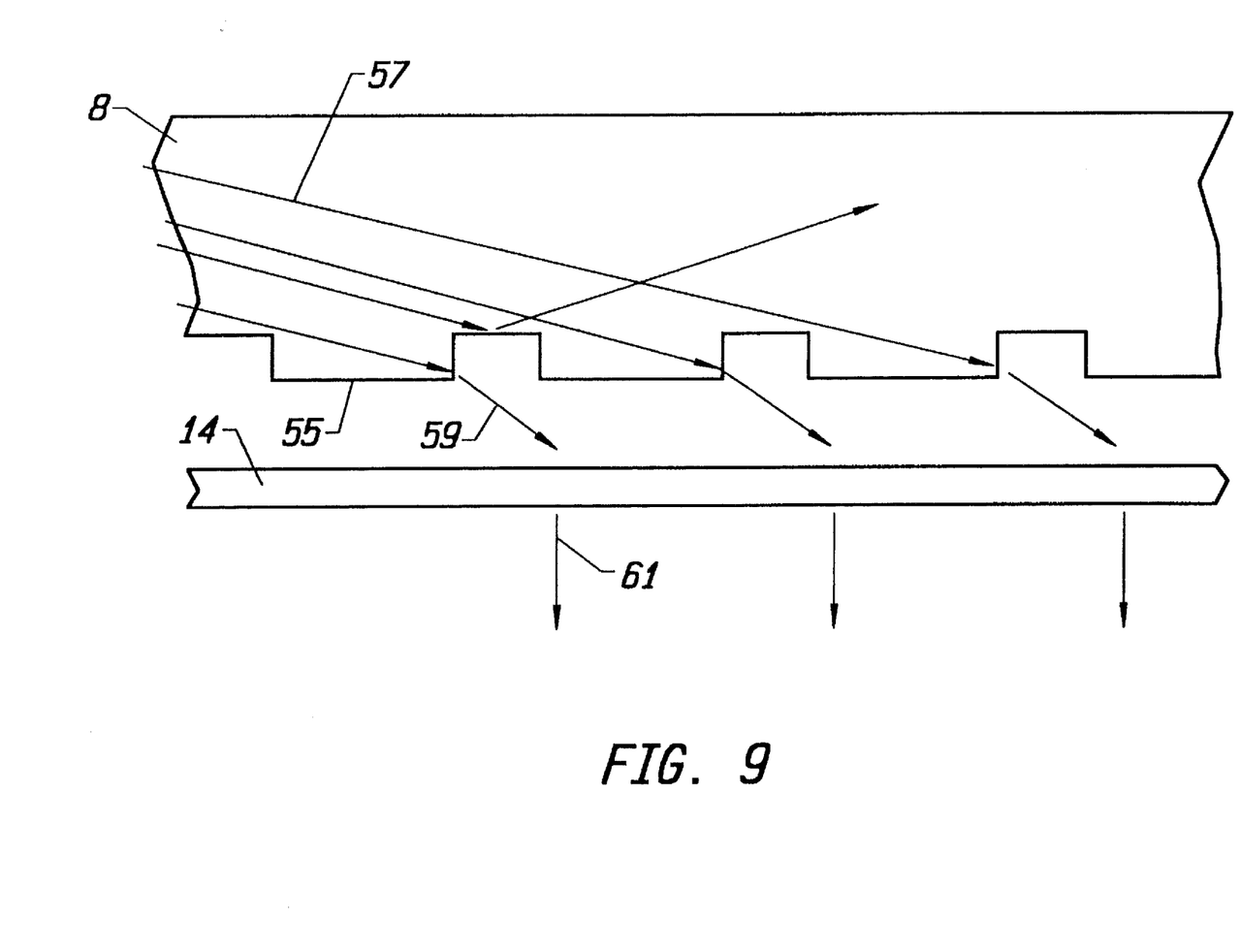
FIG. 9 is a section view of a portion of a light pipe and a beam bending film according to another embodiment of this invention to couple light out of the light pipe by transmission.

The transparent lighting systems in the embodiments described above are based on total internal reflection to couple or reflect light out of the light pipe. It is also possible to correlate light output efficiently to transmission instead of reflection. An embodiment using transmission to reflect or couple light out of light pipe is shown in FIG. 9. In this embodiment, the microprisms 55 have essentially a rectangle cross section. Light rays 57 inside the light pipe 8 hitting the side surface of a prism will pass through the surface. Since the output light 59 in this assembly makes a large angle with the normal of light pipe surface, a light beam bending film 14 is usually needed to bend output 61 towards required direction as shown in FIG. 9. With the side surfaces of a microprism 55 vertical to the base of the prism, this lighting assembly is highly transparent and can therefore be used for applications requiring high transparency such as projection displays.

Figure 10:
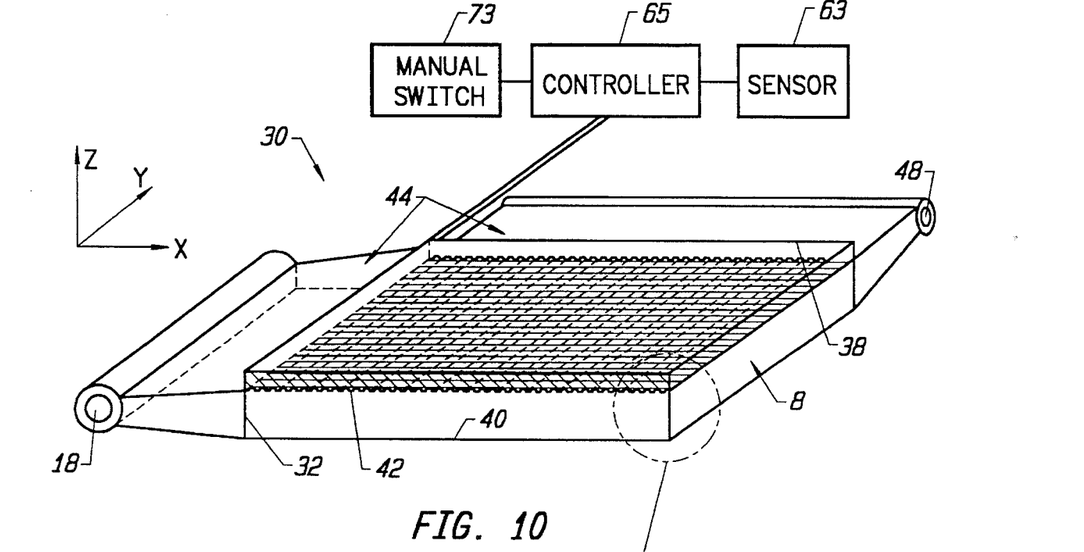
FIG. 10 is a perspective view of a transparent lighting system which is designed in accordance with another embodiment of the present invention which allows up to four linear internal light sources to be used.
Figure 10A:
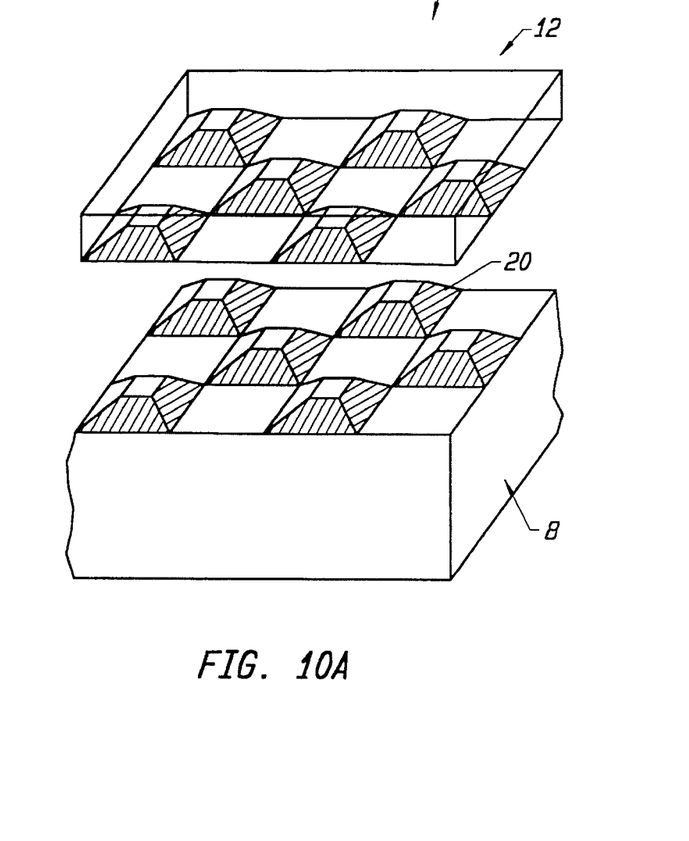
FIG. 10A illustrates a detail of the assembly of FIG. 10.

An embodiment of the transparent lighting system that can provide very bright backlighting by using two or more lamps is shown in FIG. 10. A first lamp 18 and a second lamp 48 are shown in FIG. 10, each coupled to a light directing assembly 44. In this embodiment, an arrangement of immediately adjacent micropyramids 20, extending in the x-y plane with their bases parallel to the x- and y-axis respectively, along the entire extend and serving as one surface of the light pipe 8", is used to replace rows of microprisms used in the previous embodiments. In FIG. 10A, each of the micropyramids 20 has a trapezoid cross section with its top surface parallel to the x-y plane. Moreover, with the backlighting system transparent, extremely bright backlighting can be achieved by stacking two or more transparent flat lighting pipes together.

Figure 11:
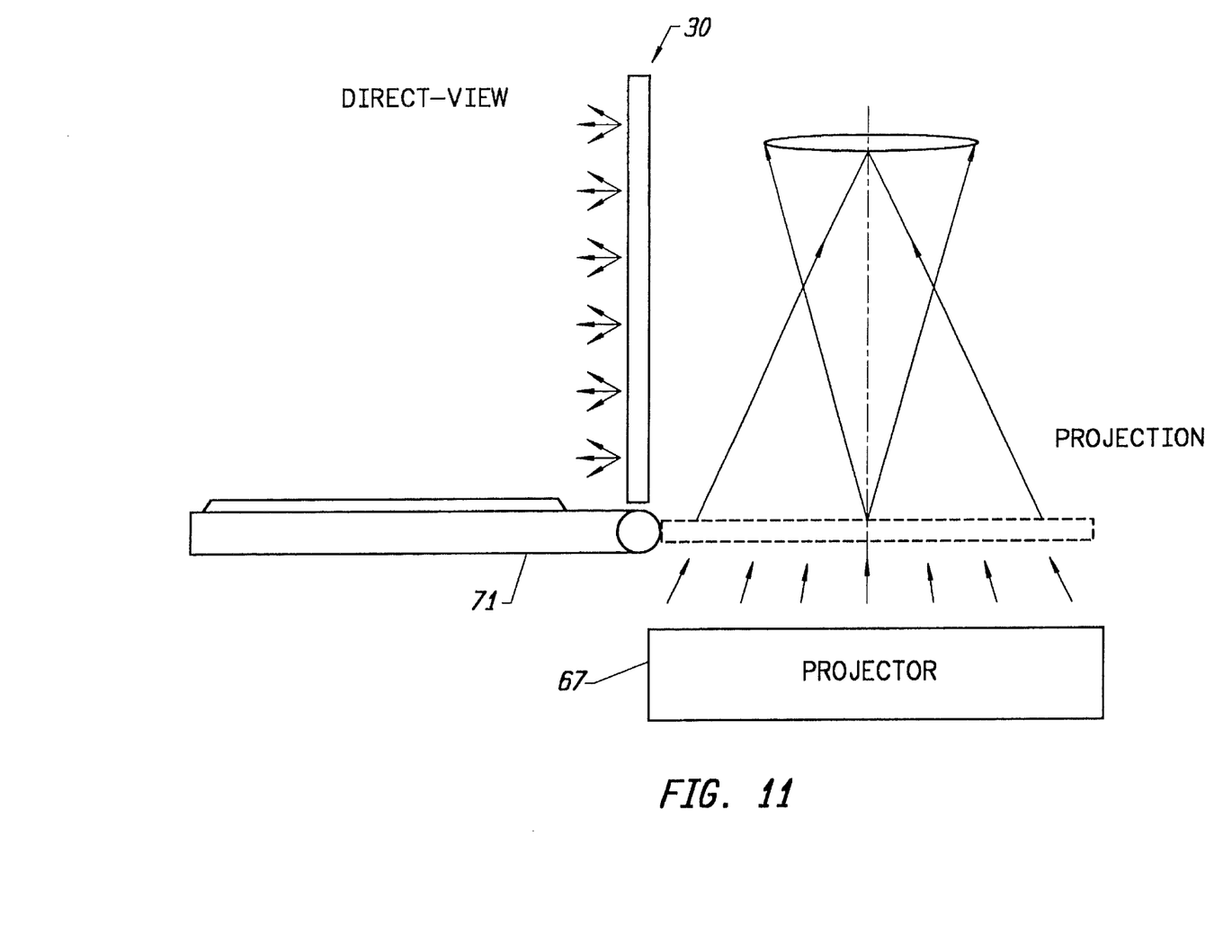
FIG. 11 illustrates schematically a dual-application display employing the transparent lighting system in accordance with the present invention.

Another feature shown in FIG. 10 is that of the ambient light sensor 63 which senses if the ambient light is sufficient to light apparatus 30 the use of internal lights 18 and 48. Light sensor is in communication with controller 65 which upon receipt of voltage signals sent by sensor 63 can either dim lights 18 and 48 or can raise their output levels. Alternatively or for use in combination with the sensor, a manual switch 73 is provided to turn off internal lights when not needed. In this way, energy can be saved when ambient light is sufficient to illuminate the display. A situation where this likely would be the case is shown in FIG. 11 where a projector such as an overhead projector 67 provides light to the back panel of apparatus 30 and is such a high illumination (oftentimes 7,000 lumens) that no internal light output is necessary for illumination. The sensor 63 is also beneficial when sunlight is bright.

The transmissive display using a transparent lighting assembly can also be used in dual application displays which are suitable for both direct view and projection. In this application, no diffuser or beam expander is necessary. As shown in FIG. 11, a beam bending film, however, can be used to bend the direction of output light to a desired direction. An identical beam bending film can be placed on the other side of the light pipe, but the orientation of prisms is turned by 180° so that any light passing through these two beam bending film will not change its propagation direction.

The computer 69 shown in FIGS. 1 and 11 depicts a controller for images that appear on the display. As discussed above, the display module 4 is composed of a liquid crystal display (LCD) panel 6. The composition of the LCD can be of any suitable type and the controller for providing images to such a display is well known. The display portion of the computer as shown includes a hinge 71 having the motion to be positionable atop a projection surface.

Figure 12:
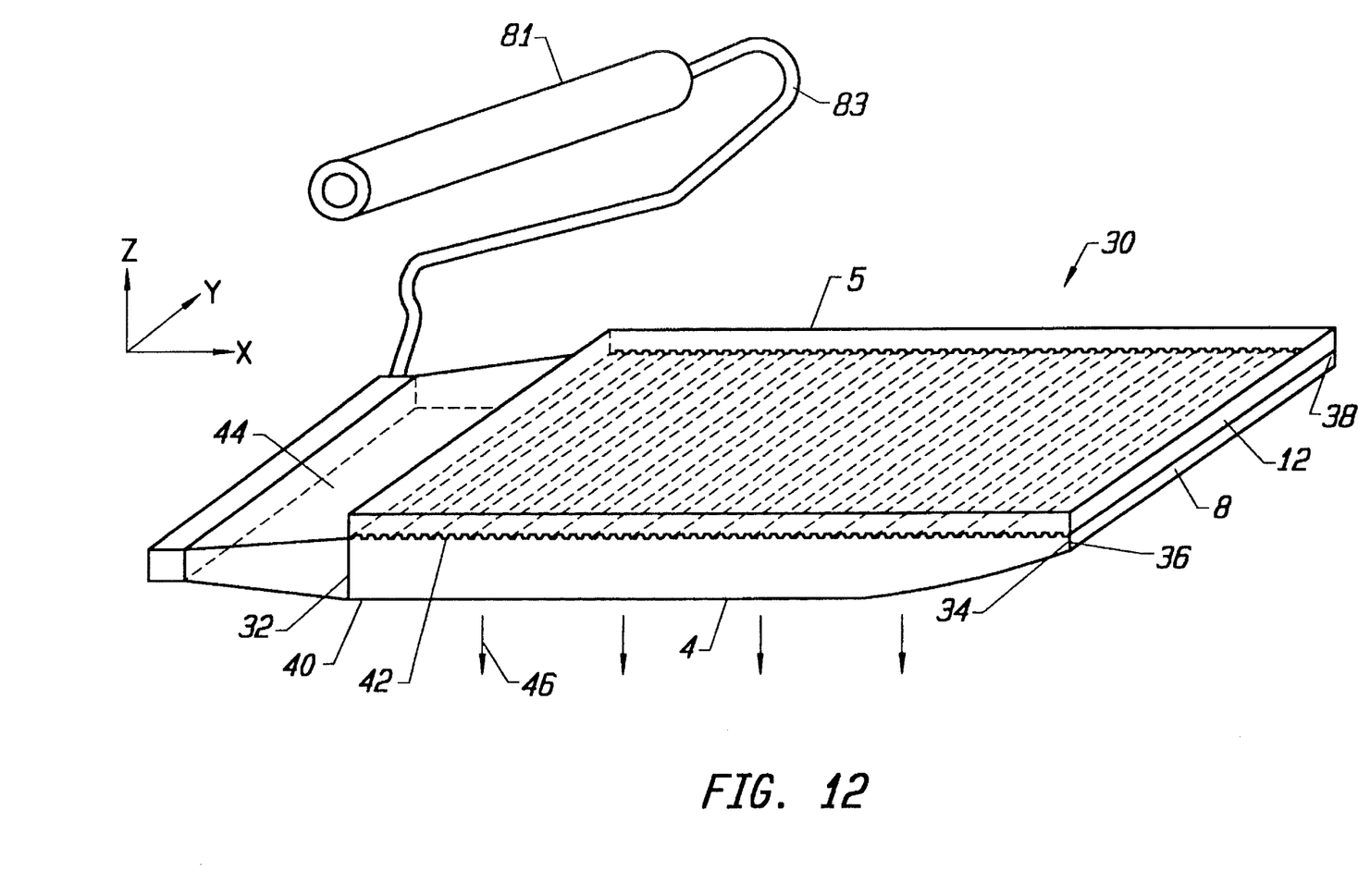
FIG. 12 shows a system similar to that shown in FIG. 2 except that instead of having an internal artificial light source, the system includes an external artificial light source.

In the embodiments shown above, the artificial light source has been positioned internally in the lighting system. The artificial light source is also positionable outside the system as shown in FIG. 12. Artificial light source 81, is a external fluorescent tube where its light is directed to an optical fiber 83, one end of which is positioned in the apparatus 30 in a manner in which provides light to the light pipe 8. Any suitable interior or exterior artificial light source and configuration for transmitting the light to light pipe 8 can be used in accordance with this invention.

Accordingly, the invention described above allows an LCD display to be used in outdoor environments while utilizing the ambient light for backlighting in addition to the use of internal lights. The light sensors further allow the system to be self regulating to provide for a more energy efficient system.

We claim:

1. A lighting system capable of utilizing ambient light for illumination, comprising:

a transmissive lighting display including a front panel and a light pipe, said front panel configured to transmit light output and said light pipe configured to receive ambient light, and wherein said light pipe is further configured to substantially transmit received ambient light to said from panel;

an artificial light source for providing light which is directed into said light pipe assembly in a predetermined way so that it is transmitted through said light pipe so that it is transmitted through said front panel; and, a light collecting film which bends ambient light to a direction normal to said light pipe.

2. A lighting system as recited in claim 1 wherein said output light has a divergent angle, said system further comprising a bending-expanding film for expanding the divergent angle of said output light.

3. A lighting system as recited in claim 1 wherein said light pipe is a first light pipe and wherein said artificial light source generates light which is directed by a second light pipe configured to direct said artificial light source generated light to said first light pipe.

4. A lighting system as recited in claim 3 wherein said second light pipe has a top surface and a bottom surface which are at tilt angles with respect to one another.

5. A lighting system as recited in claim 1 wherein said artificial light source is configured as an internal light source.

6. A lighting system as recited in claim 1 wherein said artificial light source is configured as an external light source.

7. A lighting system as recited in claim 1 wherein said lighting display further includes an liquid crystal display.

8. A lighting system as recited claim 1 further comprising:

an ambient light sensor for sensing ambient light and providing a sensor output voltage signal;

a controller for controlling the power to said artificial light source and reducing the power to said artificial light source when said sensor output voltage signal reaches a predetermined threshold.

9. A lighting system as recited in claim 1 further comprising a manual switch for eliminating power transmitted to said artificial light source.

10. A lighting system as recited in claim 1 further comprising a diffuser to mask images of objects behind said light pipe so that a viewer viewing said light output can focus attention on an image created by said light output.

11. A system as recited in claim 1 wherein said display comprises an arrangement of optical components for reflecting substantially all of the light generated by said artificial light source directed into said light pipe in a direction parallel to light pipe so that it may transmitted from said light pipe in said direction away from said light pipe.

12. A lighting system as recited in claim 1 wherein said light pipe includes an arrangement of optical components including microprisms.

13. A lighting system as recited in claim 12 wherein said light pipe has a top surface and a bottom surface and wherein said microprisms are distributed in an array over the top surface of said light pipe to reflect light by substantially total internal reflection.

14. A lighting system as recited in claim 12 wherein said light pipe has a top surface and a bottom surface and wherein said microprisms are distributed in an array over the bottom surface of said light pipe so that they transmit light through the side of said microprism.

15. A method of providing a lighting system capable of utilizing ambient light for illumination, comprising the steps of:

providing a transmissive lighting display including a front panel and a light pipe, said front panel configured to transmit light output and said light pipe configured to receive ambient light and to substantially transmit received ambient light to said front panel;

providing an artificial light source for directing light into said light pipe assembly in a predetermined way so that it is transmitted through said front panel; and providing a light collecting film which bends ambient light to a direction normal to said light pipe.

16. A method as recited in claim 15 wherein said artificial light source is provided as an internal light source.

17. A method recited in claim 15 wherein said artificial light source is provided as an external light source.

18. A method as recited in claim 15 wherein said output light has a divergent angle, said method further comprising the step of providing a bending-expanding film for expanding the divergent angle of said output light.

19. A method as recited claim 15 further comprising the steps of:

providing an ambient light sensor for sensing ambient light and providing a sensor output voltage signal;

providing a controller for controlling the power to said built-in light source and reducing the power to said artificial light source when said sensor output voltage signal reaches a predetermined threshold.

20. A method as recited in claim 15 further comprising the step of providing a manual switch for eliminating power transmitted to said artificial light source.

21. A method as recited in claim 15 further comprising the step of providing a diffuser to mask images of objects behind said back panel so that a viewer viewing the front panel can focus his attention on an image on said front panel.

22. A method as recited in claim 1 further comprising the step of providing a liquid crystal display.

23. A lighting system capable of utilizing ambient light for illumination, comprising:

a transmissive lighting display including a front panel and a light pipe, said front panel configured to transmit light output and said light pipe configured to receive ambient light, and wherein said light pipe is further configured to substantially transmit received ambient light to said front panel;

an artificial light source for providing light which is directed into said light pipe assembly in a predetermined way so that it is transmitted through said light pipe so that it is transmitted through said front panel; and a bending-expanding film for expanding the divergent angle of said output light.

24. A lighting system as recited in claim 23 further comprising a light collecting film which bends ambient light to a direction normal to said light pipe.

25. A lighting system as recited in claim 23 wherein said light pipe is a first light pipe and wherein said artificial light source generates light which is directed by a second light pipe configured to direct said artificial light source generated light to said first light pipe.

26. A lighting system as recited in claim 25 wherein said second light pipe has a top surface and a bottom surface which are at tilt angles with respect to one another.

27. A lighting system as recited claim 23 further comprising:

an ambient light sensor for sensing ambient light and providing a sensor output voltage signal;

a controller for controlling the power to said artificial light source and reducing the power to said artificial light source when said sensor output voltage signal reaches a predetermined threshold.

28. A lighting system capable of utilizing ambient light for illumination, comprising:

a transmissive lighting display including a front panel and a light pipe, said front panel configured to transmit light output and said light pipe configured to receive ambient light, and wherein said light pipe is further configured to substantially transmit received ambient light to said front panel;

an artificial light source for providing light which is directed into said light pipe assembly in a predetermined way so that it is transmitted through said light pipe so that it is transmitted through said front panel; and wherein said light pipe is a first light pipe and wherein said artificial light source generates light which is directed by a second light pipe configured to direct said artificial light source generated light to said first light pipe.

29. A lighting system as recited in claim 28 further comprising a light collecting film which bends ambient light to a direction normal to said light pipe.

30. A lighting system as recited in claim 28 wherein said output light has a divergent angle, said system further comprising a bending-expanding film for expanding the divergent angle of said output light.

31. A lighting system as recited in claim 30 wherein said second light pipe has a top surface and a bottom surface which are at tilt angles with respect to one another.

32. A lighting system as recited claim 28 further comprising:

an ambient light sensor for sensing ambient light and providing a sensor output voltage signal;

a controller for controlling the power to said artificial light source and reducing the power to said artificial light source when said sensor output voltage signal reaches a predetermined threshold.

33. A lighting system capable of utilizing ambient light for illumination, comprising:

a transmissive lighting display including a front panel and a light pipe, said front panel configured to transmit light output and said light pipe configured to receive ambient light, and wherein said light pipe is further configured to substantially transmit received ambient light to said front panel;

an artificial light source for providing light which is directed into said light pipe assembly in a predetermined way so that it is transmitted through said light pipe so that it is transmitted through said front panel;

an ambient light sensor for sensing ambient light and providing a sensor output voltage signal; and a controller for controlling the power to said artificial light source and reducing the power to said artificial light source when said sensor output voltage signal reaches a predetermined threshold.

34. A lighting system as recited in claim 33 further comprising a light collecting film which bends ambient light to a direction normal to said light pipe.

35. A lighting system as recited in claim 33 wherein said output light has a divergent angle, said system further comprising a bending-expanding film for expanding the divergent angle of said output light.

36. A lighting system as recited in claim 33 wherein said light pipe is a first light pipe and wherein said artificial light source generates light which is directed by a second light pipe configured to direct said artificial light source generated light to said first light pipe.

37. A lighting system as recited in claim 36 wherein said second light pipe has a top surface and a bottom surface which are at tilt angles with respect to one another.

38. A method of providing a lighting system capable of utilizing ambient light for illumination, comprising the steps of:

providing a transmissive lighting display including a front panel and a light pipe, said front panel configured to transmit light output and said light pipe configured to receive ambient light and to substantially transmit received ambient light to said front panel; and providing an artificial light source for directing light into said light pipe assembly in a predetermined way so that it is transmitted through said front panel;

wherein said output light has a divergent angle, said method further comprising the step of:

providing a bending-expanding film for expanding the divergent angle of said output light.

39. A method as recited in claim 38 further the step of providing a light collecting film which bends ambient light to a direction normal to said light pipe.

40. A method as recited claim 38 further comprising the steps of:

providing an ambient light sensor for sensing ambient light and providing a sensor output voltage signal;

providing a controller for controlling the power to said built-in light source and reducing the power to said artificial light source when said sensor output voltage signal reaches a predetermined threshold.

41. A method as recited in claim 38 wherein said artificial light source is provided as an internal light source.

42. A method of providing a lighting system capable of utilizing ambient light for illumination, comprising the steps of:

providing a transmissive lighting display including a front panel and a light pipe, said front panel configured to transmit light output and said light pipe configured to receive ambient light and to substantially transmit received ambient light to said front panel;

providing an artificial light source for directing light into said light pipe assembly in a predetermined way so that it is transmitted through said front panel;

providing an ambient light sensor for sensing ambient light and providing a sensor output voltage signal; and providing a controller for controlling the power to said built-in light source and reducing the power to said artificial light source when said sensor output voltage signal reaches a predetermined threshold.

43. A method as recited in claim 42 further the step of providing a light collecting film which bends ambient light to a direction normal to said light pipe.

44. A method as recited in claim 42 wherein said output light has a divergent angle, said method further comprising the step of providing a bending-expanding film for expanding the divergent angle of said output light.

45. A method as recited in claim 42 wherein said artificial light source is provided as an internal light source.

46. A method recited in claim 42 wherein said artificial light source is provided as an external light source.

* * * * *